US008595541B2

(12) United States Patent
Rowland

(10) Patent No.: US 8,595,541 B2
(45) Date of Patent: Nov. 26, 2013

(54) DATA PROCESSING MODULES REQUIRING DIFFERENT AVERAGE CLOCK FREQUENCIES HAVING A COMMON CLOCK AND A CLOCK GATING CIRCUIT FOR DELETING CLOCK PULSES APPLIED TO THE MODULES AT TIMES CONSISTENT WITH DATA SOURCING AND SINKING CAPABILITIES

(75) Inventor: Paul Rowland, Hertfordshire (GB)

(73) Assignee: Imagination Technologies, Ltd., Kings Langlet, Hartfordshire (GB)

( * ) Notice: Subject to any disclaimer, the term of this patent is extended or adjusted under 35 U.S.C. 154(b) by 859 days.

(21) Appl. No.: 12/215,691

(22) Filed: Jun. 27, 2008

(65) Prior Publication Data
US 2009/0019303 A1    Jan. 15, 2009

(30) Foreign Application Priority Data

Jun. 29, 2007 (GB) ..................................... 0712788

(51) Int. Cl.
*G06F 1/00* (2006.01)
*G06F 13/24* (2006.01)

(52) U.S. Cl.
USPC ............................ 713/501; 375/376; 710/267

(58) Field of Classification Search
USPC ............................. 713/400, 600; 710/22, 105
See application file for complete search history.

(56) References Cited

U.S. PATENT DOCUMENTS

| 5,192,914 | A | | 3/1993 | Sudo et al. | |
|---|---|---|---|---|---|
| 5,777,500 | A | * | 7/1998 | Eitrheim | 327/174 |
| 5,802,378 | A | * | 9/1998 | Arndt et al. | 710/267 |
| 6,166,572 | A | * | 12/2000 | Yamaoka | 327/149 |
| 6,240,524 | B1 | * | 5/2001 | Suzuki | 713/500 |
| 6,247,082 | B1 | * | 6/2001 | Lo et al. | 710/105 |
| 6,396,889 | B1 | * | 5/2002 | Sunter et al. | 375/376 |
| 6,516,366 | B1 | * | 2/2003 | Gates et al. | 710/105 |
| 6,553,435 | B1 | * | 4/2003 | Normoyle et al. | 710/22 |
| 6,735,712 | B1 | * | 5/2004 | Maiyuran et al. | 713/501 |
| 2001/0010482 | A1 | * | 8/2001 | Oki et al. | 330/10 |
| 2004/0168134 | A1 | | 8/2004 | Prasad | |
| 2004/0215994 | A1 | * | 10/2004 | Takata | 713/400 |
| 2005/0111572 | A1 | * | 5/2005 | Kuroda et al. | 375/295 |
| 2006/0195714 | A1 | | 8/2006 | Hanaki | |
| 2006/0221936 | A1 | * | 10/2006 | Rauchwerk | 370/352 |
| 2007/0016757 | A1 | * | 1/2007 | Anderson et al. | 712/214 |

OTHER PUBLICATIONS

United Kingdom Patent Office Search Report dated Oct. 26, 2007.

* cited by examiner

*Primary Examiner* — Thomas Lee
*Assistant Examiner* — Aurel Prifti
(74) *Attorney, Agent, or Firm* — Michael S. Garrabrants; ArtesynIP, Inc.

(57) ABSTRACT

A method and apparatus are provided for docking data processing modules, which require differing average clock frequencies, and for transferring data between the modules. This comprises a means for providing a common dock signal to modules. Clock pulses are deleted from the common clock signal to individual modules in dependence on the docking frequency required by each module. Clock pulses are applied to modules between which data is to be transferred at times consistent with the data transfer.

32 Claims, 5 Drawing Sheets

DATA PROCESSING MODULES REQUIRING DIFFERENT AVERAGE CLOCK FREQUENCIES HAVING A COMMON CLOCK AND A CLOCK GATING CIRCUIT FOR DELETING CLOCK PULSES APPLIED TO THE MODULES AT TIMES CONSISTENT WITH DATA SOURCING AND SINKING CAPABILITIES

FIELD OF THE INVENTION

This invention relates to a clock frequency adjustment for semi-conductor devices and in particular to the adjustment of clock frequencies for the semi-conductor devices which comprise a plurality of modules clocked at different rates, most typically, multiple processing elements provided upon a system on chip (SoC).

BACKGROUND TO THE INVENTION

As semi-conductor devices are becoming smaller and smaller, system on chip devices are being produced with more and more different processing elements integrated on the same chip. These processing elements previously have been provided as separate semi-conductor devices.

The semi-conductor devices perform their functions in response to clock signals which are provided at one or more inputs to the device, and are divided and distributed internally to the various processing elements. Where different processing elements form part of the same system and signals are transferred between them, a common clock is normally used. If the various processing elements have different clock frequency requirements then some consideration needs to be given to how data is transferred between those modules. Data transfer can be kept simple if the modules are clocked at integer clock ratios with respect to each other. It is seen, however, that if arbitrary clock ratios are required then more expensive and complex synchronisation is required, and this can result in an increased latency penalty on data transfers.

A typical example SoC device is shown in FIG. 1. This comprises a plurality of modules 2, 4 and 6. These modules 2, 4 and 6 may be any combination of central processing units, co-processors, interfaces, arbitration units, or any other circuitry required by the SoC that is driven by a clock.

A master clock signal 8 is provided to phase lock loop (PLL) 10. Module 1 takes the clock signal from the PLL 10 as clock 1 and performs its functions at this clocking rate.

Modules 2 and 3 do not need to run as fast as the frequency of clock 1 which is provided to module 1. Therefore, the clock signal to module 2 (clock 2) passes through a divide by N unit 12 and the clock input to module 3 (clock 3) passes through a divide by M unit. In this case, N and M are integer amounts. Clocking modules 2 and 3 at a lower rate minimises power consumption by these modules.

It will be appreciated that provided M and N are kept at simple integer ratios and all three clocks are carefully synchronised, the transfer of the data between the modules may be kept relatively simple. For example, it can be arranged that module 1 will only update its outputs to and read its inputs from module 2 every N clock cycles. Similarly, module 1 will only transfer the data to and read its inputs from module 3 once every M clock cycles.

If other ratios of M and N are used (i.e. non integer values) the transfer of the data between the modules can become more complex and it can become necessary to insert a first in first out (FIFO) buffer or some special synchronisation logic 16 as shown between modules 2 and 3 in FIG. 1.

Some processing systems will have processing requirements which are dynamically variable. Thus, a circuit such as FIG. 1 could use module 1 to perform a significant amount of processing before module 2 performs any processing at all. If module 2 were clocked at the same rate as module 1 then there would be unnecessary power consumption by module 2 in the first stage of the process. If module 2 is operated at a lower clock frequency then the second part of the process would be performed more slowly than the first part. Dynamic variation of clock speed is desirable to provide optimal processing rates in such situations but difficult to achieve, especially when there is a requirement to transfer the data between the modules running at different clock frequencies.

SUMMARY OF THE INVENTION

Preferred embodiments of the present invention provide a system in which effective clock rate of any module can be fine tuned. This is achieved by providing synchronised clock signals to each module in the SoC where each clock signal is being run at the same basic rate. In order to reduce the clocking rate for a module, a clock gating cell is provided in the clock input line. This is under the control of a clock deletion control unit which controls the clock gating cell to delete clock pulses which are not required in order to achieve an apparent lower clock rate, or a variable clock rate.

Preferably the clock deletion control unit can be set up to delete any arbitrary number of clock pulses from a master clock signal in a set period to achieve the effective clock frequency required. Furthermore, the clock deletion control unit can be modified to regulate the effective clock frequency as required by algorithms running on the processing elements or modules. This control may be via a register setting, possibly modifiable by software running on the SoC, or alternatively it can be dynamically set to an optimum value via a metric generated within the algorithms running within the module to which the clock pulses are supplied.

Each module within the SoC may have its own dedicated clock deletion control unit and clock gating cell so that each may be run at different clocking rates. Safe data transfer between the modules running at different clocking rates is handled by either forcing a clock pulse on the sending and receiving modules when there is data to be transferred, or by using an existing two way handshake to deliberately stall the transfer of the data until appropriate clock pulses happen to occur on both the sending and receiving modules. A combination of these methods may also be used.

BRIEF DESCRIPTION OF THE DRAWINGS

An embodiment of the invention will now be described in more detail by way of example with reference to the accompanying drawings in which:

FIG. 7 shows one arrangement of the clocking configuration for use with an embodiment of.

DETAILED DESCRIPTION OF PREFERRED EMBODIMENTS

Figure 1:
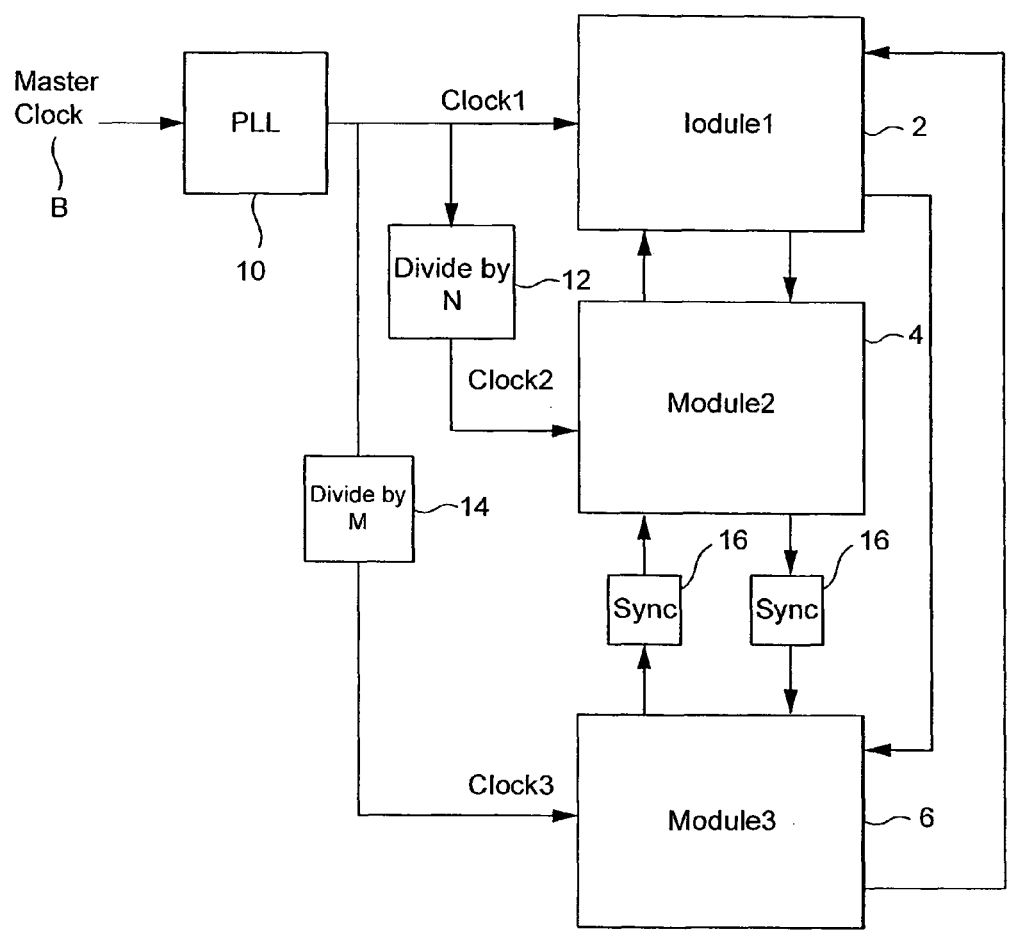
FIG. 1 is the prior art system referred to above.
Figure 2:
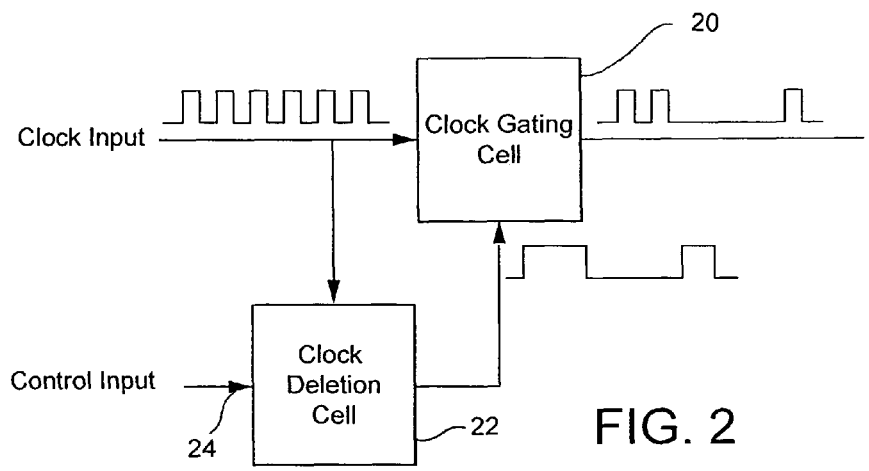
FIG. 2 shows a clock gating cell and a clock deletion control unit in accordance with an embodiment of the invention.

In a preferred embodiment of the invention, the divide by N and the divide by M units 12, 14 of FIG. 1 are replaced by the clock deletion unit of FIG. 2. This comprises a clock gating cell 20 which is positioned between the clock and the clock input to a module. This clock gating cell 20 also received an input from a clock deletion control unit 22. This clock deletion control unit 22 also receives the same clock input as the clock gating cell 20. In addition, it receives a control input 24 which contains data relating to the required clocking rate, which is to be applied to the module in question. In response to the control input 24, the clock deletion control unit 22 generates a series of pulses which are applied to the clock gating cell 20 and in turn cause a clock pulse to be generated at the module.

Thus, the clock deletion control unit 22 of FIG. 2 can be set up to delete any arbitrary clock pulses from the master clock signal within a set clock period, and in any arbitrary order to achieve the effective clock frequency required. Furthermore, the control input 24 may be modified at any time to change the effective clock frequency as required by the algorithms running on the module.

In a preferred embodiment, each of the divide by N and divide by M units 12, 14 in FIG. 1 will be replaced by a clock deletion unit shown in FIG. 2. Indeed it may be preferable3 to provide a clock deletion unit for each of the three modules 2, 4 and 6 in FIG. 1, thereby ensuring that each can be controlled at a varying rate, whereby any module which is not required to perform processes at a particular time may have its clocking pulses removed to a clock deletion unit.

When the SOC is in operation, it will from time to time be necessary to transfer the data between two or more modules. When this is necessary, it must be ensured that the modules are clocked at the appropriate times. This can be achieved in a number of ways, for example, by forcing a clock pulse on both modules at the appropriate times when there is valid data to transfer, or, by using existing two-way handshake wires to naturally control the data flow from one module to the other where the transfer is recognised at both sides. The use of the handshake signal is subverted to allow only data to flow on the occasions when there happens to be a coincident clock pulse on both modules.

The two-way handshake protocol used here for illustration is named "valid-enable" which recognises the data transfer from one module to the next on the same clock.

It is also possible to accommodate two-way handshake protocols which recognise the transfer on different clocks. These require different specific logic designed around the interface protocol for the data transfer.

Examples of the two methods of transferring the data between the modules which may be used in embodiments of the present invention will be described. In particular, methods for transferring the data between the modules which are clocked at different effective rates will be shown. Both techniques may be used on the same SoC between any number of modules running at any number of effective clock rates. The best choice for the method selected will depend on whether or not the one-way or two-way hand shake protocol is available. It may also depend on the expected characteristics of the data transfer by the selected interface.

Figure 3:
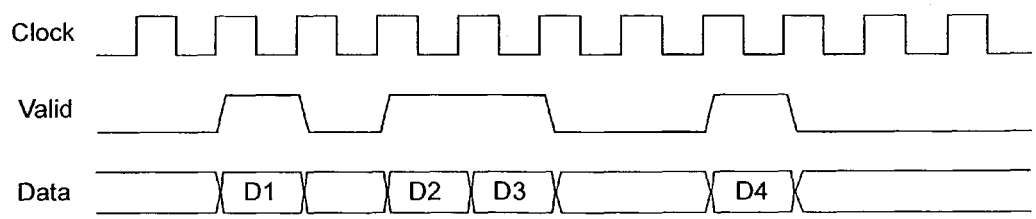
FIG. 3 shows the time wave forms of a non-stalling (valid only) protocol.

The first example is a non-stalling (known here as 'valid-only') protocol which can be used at an appropriate module interface. The signals used in the data transfer are shown in FIG. 3. As can be seen, there is a clock signal shown on the top line. The second line represents a handshake wire 'valid', when high indicates that the 'Data' wires have a value to be transferred. Valid data to be transferred in shown is FIG. 3 as D1, D2, D3 and D4.

In the case where both modules are driven by the same clock, the 'valid-only' protocol works without problem. If, however, the modules are driven at different rates with different clock control settings there is possibility for losing valid data, or for mis-interpreting single words of valid data as multiple words. To avoid this error the valid signal is taken and combined with the clock gating signals from each of the clock control units to force a clock pulse on each module whenever there is the valid data to be transferred.

Figure 6:
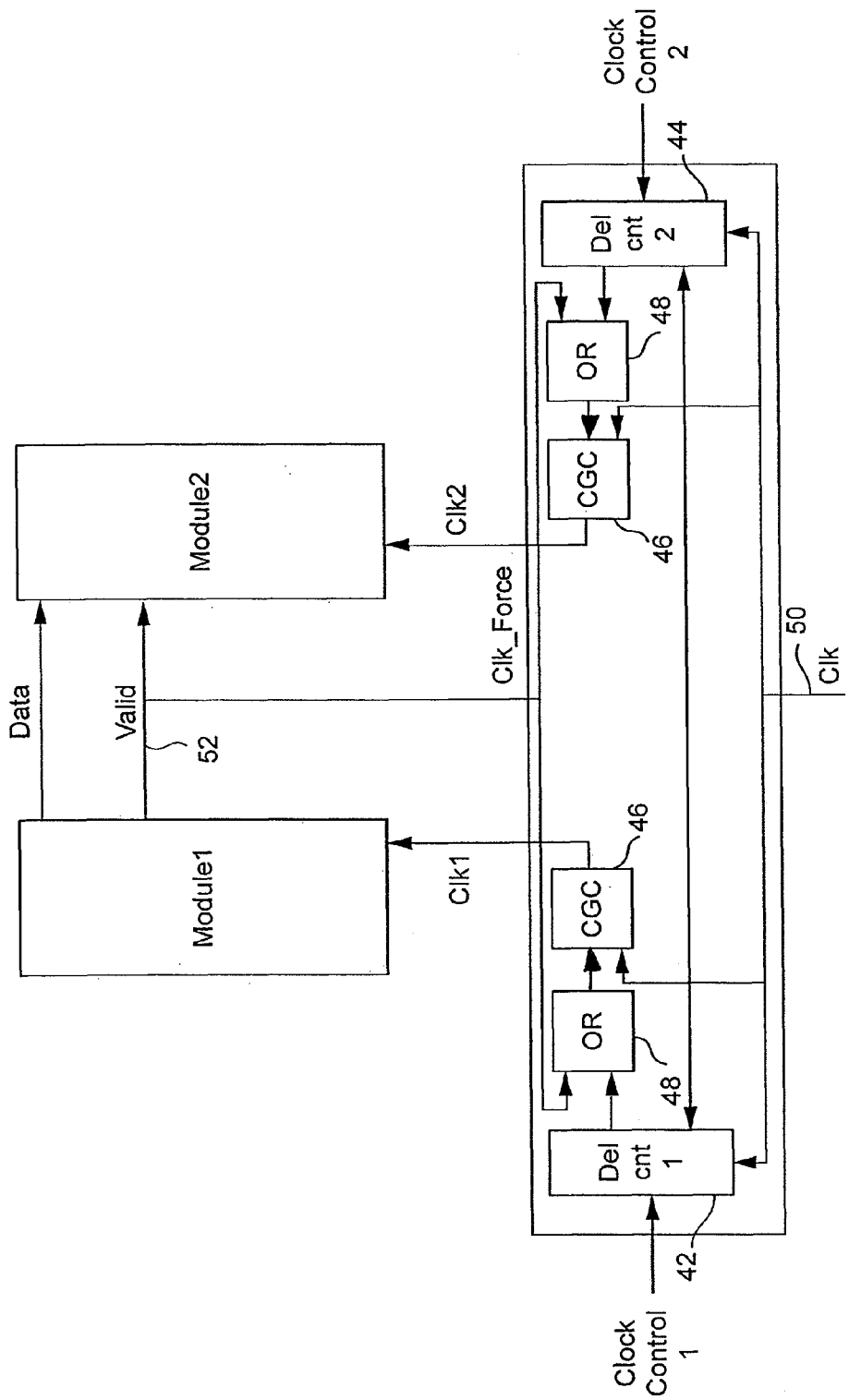
FIG. 6 shows an embodiment of the invention in which a two-way handshake protocol is modified to ensure the correct data transfer.

A specific embodiment is illustrated in FIG. 6. This is a system in which a coincident clock pulse is forced on both sending and receiving modules when the data is ready to be transferred. FIG. 6 shows two modules which can be clocked at different effective clock rates by respective clock deleter circuits. The two modules are modules 1 and module 2. Module 1 has a clock deletion control unit 42 which receives clock control 1. Module 2 has a clock deletion control unit 44 which receives clock control 2 at its control input.

Each of the clock deletion control units 42 and 44 provides control signals to their respective clock gating cells 46 via a respective OR gate 48. The same clock signal 50 is provided to each of the clock deletion units 42 and 44 and to the two clock gating cells 46.

Module 1 has to transfer the data to module 2. When it is ready to transfer that data it produces a valid signal 52 which is applied to module 2 and which is also applied to the second input of each of the OR gates 48. The effect of the valid signal is to cause the output of each OR gate 48 to be enabled irrespective of the outputs of the clock deletion control units 42 and 44.

Thus, the OR gates 48 provide enable signals to their respective clock gating circuits 46 in response to the valid signal 52 or the outputs of the respective clock deletion control units 42 and 44, causing the clock signal 50 to pass through the respective clock gating cell 46 when the output of the respective OR gate 48 is enabled.

Sophisticated implementations would account for the additional pulses by deleting extra pulses later so the aggregate clock count matches the required rate over a period of time.

Figure 4:
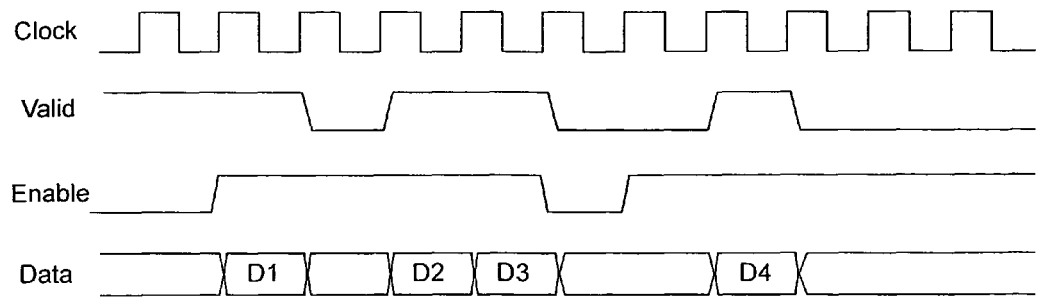
FIG. 4 shows the time wave form for data transfer between modules with a specific two way handshake (valid-enable protocol)

When a handshake mechanism is present which allows the receiving module to stall the data transfer an alternative mechanism is employed to ensure the correct data transfer when the modules are clocked at different effective rates. The example protocol used for illustration is known here as a valid-enable transfer which is a two-way handshake protocol. The protocol is illustrated in FIG. 4. The first line shows the clock signal. The second line shows the 'valid' signal which originates from the sending module and indicates that the value on the data wires is of interest and to be sent to the receiving module. The third line shows the 'enable' signal which originates from the receiving module and indicates that the module is ready to accept data. When both the valid and enable signals are high, data is transferred from the sending module to the receiving module, shown in FIG. 4 as D1, D2, D3 and D4. Without special treatment, this protocol would also suffer from incorrect data transfer if the sending and receiving modules were clocked by different effective clock rates. To avoid this error, the handshake signals themselves are used to ensure that the data is transferred only when there are appropriate clocks on both modules.

Figure 5:
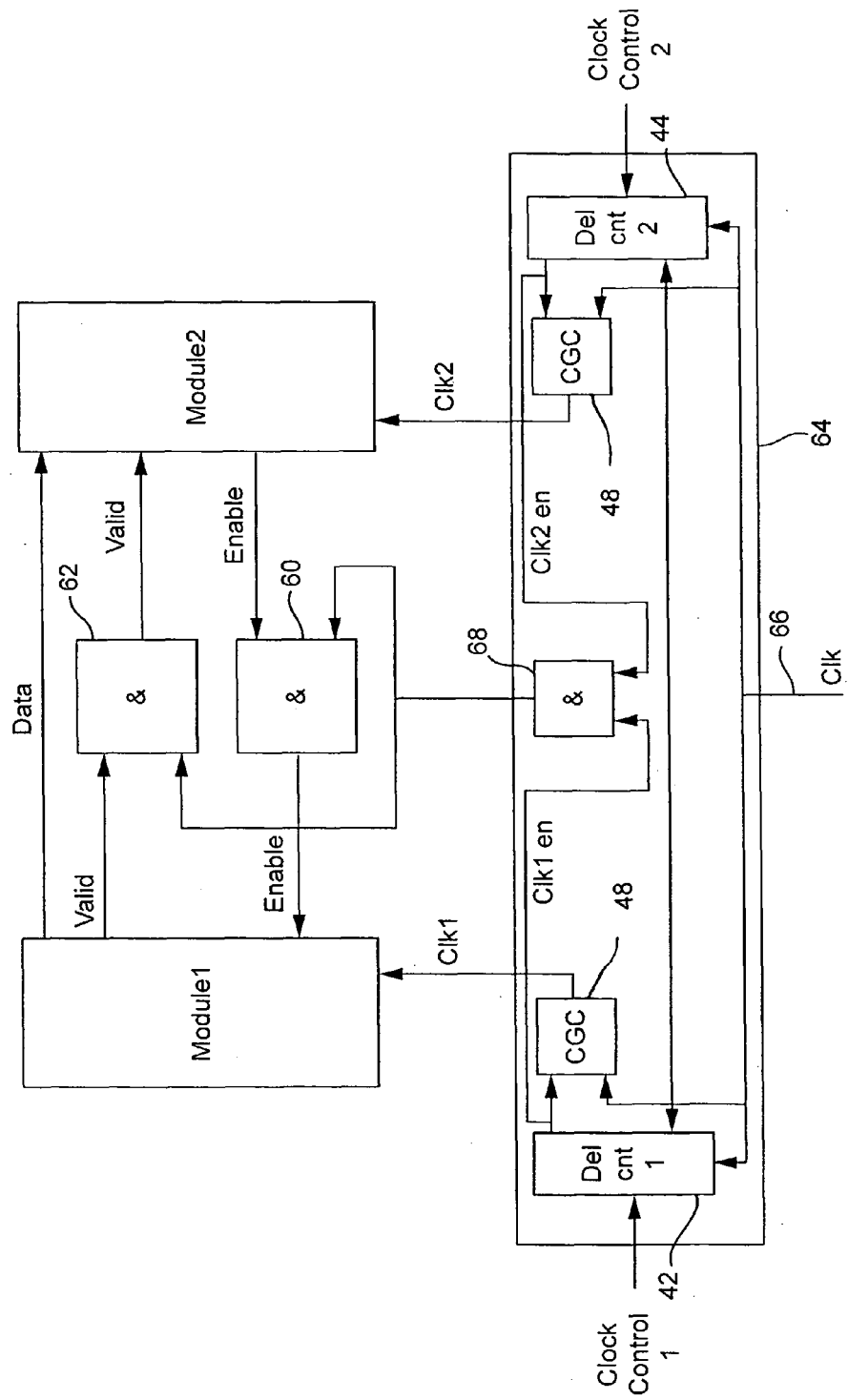
FIG. 5 shows an embodiment of the invention in which clock pulses are forced onto the modules to ensure correct data transfer.

A specific embodiment of this alternative arrangement for transferring the data between the modules in the SoC is shown in FIG. 5. This type of arrangement uses a two-way hand shake between the modules whereby one processing element can stall back another processing element which wishes to make a data transfer. The effect of this two-way handshake is to ensure that the data transfer is possible only when there happens to be coincident clock pulses applied to both sending and receiving modules.

In this arrangement 6, module 1 has an enable input which is asserted in response to the output of an AND gate 60. Module 2 correspondingly has a valid input which is asserted by the output of an AND gate 62. The enable input to module 1 permits it to send data to module 2 and the valid input of module 2 permits it to receive data from module 1.

A first input of the AND gate 60 is an enable signal produced by module 2 when it is in a state in which it is ready to receive the data from module 1. A first input of the AND gate 62 is a valid output from module 1 which is produced when it is able to send the data to module 2. The respective second inputs of the AND gates 60 and 62 are provided by a clocking circuit 64.

The clocking circuit 64 has a clock input 66. This clocking signal is sent to two clock gating circuits of the type described with reference to FIG. 2. Module 1 has an clock gating unit comprising a clock deletion control unit 42 receiving a clock control signal 1 at its clock control input. The output of the clock deletion control unit 42 and the clock signal 66 are provided to its clock gating cell 48 which provides a clock signal to module 1.

Correspondingly, for module 2, a clock deletion control unit 44 receives a clock control signal 2 at its control input and provides an output to its clock gating cell 48 which in turn provides a clocking signal to module 2.

The output of the two clock deletion control units 42 and 44 are also provided to an additional AND gate 68. The output of this AND gate 68 forms the second input to the two AND gates 60 and 62. Thus, when the two clock control signals cause the respective clock deletion control units 42 and 44 to provide enabling pulses to their respective clock gating cells 48, the output of the AND gate 68 is asserted, thereby permitting the data to pass from module 1 to module 2 if module 1 produces a valid signal on its valid output line and module 2 produces an enable signal on its enable line, i.e. when module 1 is ready to send the data and module 2 is also ready to receive the data. When this happens, the data is sent from module 1 to module 2 in response to the clock signals provided at their respective clock inputs by the respective clock gating cells 48.

This arrangement works most effectively when the clock deletion circuits have a maximum number of coincident clock pulses between them, thereby minimising the chance of one module being unnecessarily stalled whilst waiting for the data to be transferred to or from the other. A line is shown between the two clock deletion control units 42 and 44 in FIG. 5 and this line represents a linkage between the two clock control inputs to provide some synchronization and thereby ensure maximum number of coincident clock pulses.

In these embodiments of the invention, clock control signals may be hard wired to a constant if no control of the clock rate is required. Alternatively, they may be wired to a register so that the clock rate may be controlled by software running on a processor. Alternatively the control signals may be dynamically adjusted by the module whose clock is being controlled, or indeed by any other module responsible for controlling the clocking rates of other modules.

In the dynamic control case, a metric may be used to provide an indication of whether or not the module being clocked is operating correctly in meeting its real time requirements or whether some adjustment to the clocking speed is required. This metric could be generated, for example, by using the fullness of an appropriate FIFO buffer or other hardware that could be constructed to provide an indication of how much the module is over or under performing. This metric can then be fed back to drive directly the clock control signals via suitable scaling and offsetting.

Preferably, each of the plurality of modules is clocked with the minimum possible number of clock pulses in any given period of time. It is generally possible to calculate or deduce the minimum clock frequency that each module needs to be clocked at in order to operate its task. The clocking may be controlled within a time period to have periods of inaction and periods of higher frequency clocking if the flow of the data in the system dictates that this is required.

Figure 7:
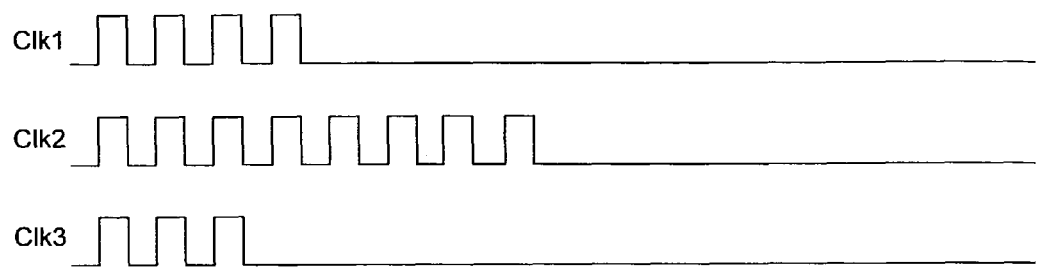

It is preferable to maximise the number of concurrent clock pulses between the modules so that the data is more likely to be transferred between the modules when it becomes available, rather than to wait and possibly slow down the system. For example the system may have three modules that are driven by clock 1, clock 2 and clock 3 or driven from a common master clock. It may have been deduced that the new clock rates required for clock 1, clock 2 and clock 3 are four pulses, eight pulses and three pulses respectively for every sixteen clock periods. A possible configuration for this is shown in FIG. 7 with the clock pulses required for clock 1, clock 2 and clock 3. In this example, all the clock pulses occur at the beginning of a sixteen period cycle for a respective minimum number of clock cycles to maximise the number of concurrent clock pulses.

Figure 8:
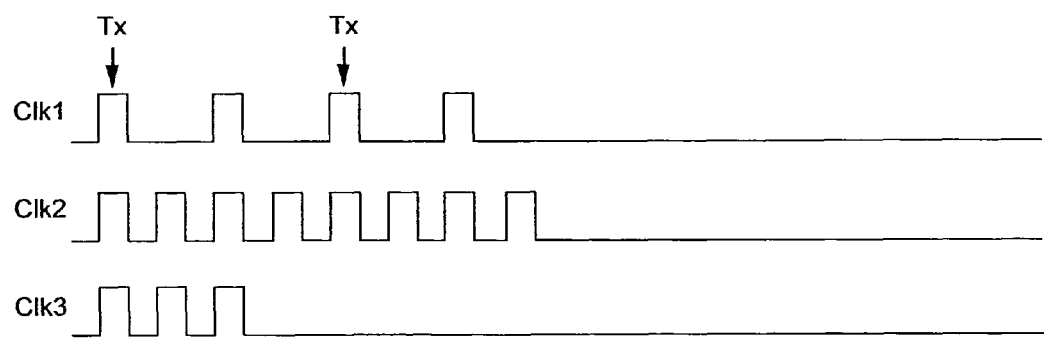
FIG. 8 shows an optimised clocking configuration for transfer between modules 1 and 2 in FIG. 6.

It is also desirable to take account of the expected rates at which the modules produce or receive the data and modify the clocking pattern appropriately. For example, if module 1 delivers the data to module 2 on average one word every two clock pulses, module 2 needs four clock pulses to deal with each word it receives, the arrangement of clock pulses shown in FIG. 7 being inappropriate. For this situation, the FIFO buffer between the modules would be required to maintain smooth data flow. Alternatively, this requirement can be eliminated by arranging the waveforms differently as shown in FIG. 8. In this, the clock pulses applied to clock 1 are spread to enable module 2 to process the data as it receives it from module 1.

To produce waveforms with characteristics such as waveforms shown in FIG. 8, the clock deletion control unit will need to be configured with frame length corresponding to the number of clock periods before a particular cycle restarts. It would also need to know the number of active cycles, i.e. the number of clock periods within a frame for which a clock pulse is generated, and the number of clock periods between output pulses. This would then enable its clock pulse to be altered to ensure optimum flow of data between modules.

The invention claimed is:

1. A method for clocking a plurality of data processing modules which require different average clock frequencies and for transferring data between the modules, the method comprising the steps of:
   providing a common clock signal to each of clock gating circuits associated with each of the modules;

deleting clock pulses from the common clock signal provided to the respective clock gating circuit in dependence on one of the clock frequencies required by the respective module;

applying the clock pulses to the modules between which the data is to be transferred at times consistent with data transfer;

performing a handshake operation between the modules between which the data is to be transferred; and gating the handshake operation such that the data is prevented from being transferred when appropriate patterns of the clock pulses are not available, wherein the clock pulses are applied to the modules at times consistent with data sourcing and sinking capabilities of the modules between which the data is to be transferred.

2. The method according to claim 1, wherein the clock pulses are applied to the modules substantially synchronously to the data transfer.

3. The method according to claim 1, wherein the clock pulses are applied to the modules at different times from the data transfer.

4. The method according to claim 1, wherein the clock pulses are applied to the modules between which the data is to be transferred in response to interface protocol signals related to the data transfer.

5. The method according to claim 4 further including the step of adjusting the number of the clock pulses subsequently applied to the modules in dependence on the number of the clock pulses applied in response to the interface protocol signals related to the data transfer.

6. The method according to claim 1, wherein the step of applying the clock pulses comprises the steps of providing a signal from a first module indicating that the first module is ready to transfer the data, and applying the clock pulses to the first module and to a second module for receiving the data in response to the signal from the first module.

7. The method according to claim 6, wherein the step of applying the clock pulses to the first and the second modules comprises the step of controlling the deleting step such that the clock pulses are provided synchronously to the first and the second modules.

8. The method according to claim 7, wherein the step of applying the clock pulses comprises the step of inhibiting the deleting step such that all of the clock pulses pass to the first and the second modules while the deleting step is inhibited.

9. The method according to claim 1, wherein the step of performing the handshake operation includes the steps of providing a first signal from a first module indicating that the first module is ready to transfer the data and a second signal from a second module indicating that the second module is able to receive the data, and passing the first signal to the second module and the second signal to the first module in the handshake operation in response to appropriate clock signals being applied to the first and the second modules.

10. The method according to claim 9, wherein the clock signals are applied to the first and the second modules in response to coincident clock gating signals being applied to the respective clock gating circuit for the first and the second modules.

11. The method according to claim 10, wherein the respective clock gating circuit performs the deleting step.

12. The method according to claim 1 further including the step of dynamically altering each of the clock frequencies required by each module.

13. The method according to claim 1 further including the step of monitoring a metric to determine whether any adjustment to each of the clock frequencies of the modules is required.

14. An apparatus for clocking a plurality of data processing modules which require different average clock frequencies and for transferring data between the modules comprising:

means for providing a common clock signal to each of clock gating circuits associated with each of the modules;

means for deleting clock pulses from the common clock signal provided to the respective clock gating circuit in dependence on one of the clock frequencies required by the respective module;

means for applying the clock pulses to the modules between which the data is to be transferred at times consistent with data transfer;

means for performing a handshake operation between the modules, between which the data is to be transferred; and means for gating the handshake operation such that the data is prevented from being transferred when appropriate patterns of the clock pulses are not available, wherein the clock pulses are applied to the modules at times consistent with data sourcing and sinking capabilities of the modules between which the data is to be transferred.

15. The apparatus according to claim 14, wherein the means for applying the clock pulses to the modules enables the clock pulses to be applied substantially synchronously to the data transfer.

16. The method according to claim 14, wherein the clock pulses are applied to the modules at different times from the data transfer.

17. The apparatus according to claim 14, wherein the means for applying the clock pulses to the modules performs in response to interface protocol signals related to the data transfer.

18. The apparatus according to claim 17 further including means for adjusting the clock pulses subsequently applied to the modules in dependence on the number of the clock pulses applied in response to the interface protocol signals related to the data transfer.

19. The apparatus according to claim 14, wherein the means for applying the clock pulses to the modules comprises means for providing a signal for a first module indicating that the first module is ready to transfer the data, and means for applying the clock pulses to the first module and to a second module for receiving the data in response to the signal from the first module.

20. The apparatus according to claim 19, wherein the means for applying the clock pulses to the first and the second modules comprises means for controlling the deleting means such that the clock pulses are provided sequentially to the first and the second modules.

21. The apparatus according to claim 20, wherein the means for applying the clock pulses comprises means for inhibiting the deleting means such that all of the clock pulses pass to the first and the second modules while the deleting means is inhibited.

22. The apparatus according to claim 14, wherein the means for performing the handshake operation includes means for providing a first signal from a first module indicating that the first module is ready to transfer the data and a second signal from a second module indicating that the second module is able to receive the data, and means for passing the first signal to the second module and the second signal to the first module in the handshake operation in response to appropriate clock signals being applied to the first and the second modules.

23. The apparatus according to claim 22, wherein the means for applying the clock signals to the first and the second modules performs in response to coincident clock gating signals being applied to the respective clock gating circuit for the first and the second modules.

24. The apparatus according to claim 23, wherein the deleting means comprises the respective clock gating circuit, and the respective clock gating circuit performs deletion of the clock pulses.

25. The apparatus according to claim 14 further including means for dynamically altering each of the clock frequencies required by each module.

26. The apparatus according to claim 14 further including means for monitoring a metric to determine whether any adjustment to each of the clock frequencies of the modules is required.

27. A method for clocking a plurality of data processing modules which require different average clock frequencies and for transferring data between the modules, the method comprising the step of:
providing a common clock signal to each of clock gating circuits associated with each of the modules;
deleting clock pulses from the common clock signal provided to the respective clock gating circuit in dependence on one of the clock frequencies required by the respective module;
performing a handshake operation between the modules between which the data is to be transferred; and
controlling the handshake operation such that data transfer only occurs in the presence of appropriate patterns of the clock pulses applied to the modules between which the data is to be transferred,
wherein the clock pulses are applied to the modules at times consistent with data sourcing and sinking capabilities of the modules between which the data is to be transferred.

28. An apparatus for clocking a plurality of data processing modules which require different average clock frequencies and for transferring data between the modules comprising:
means for providing a common clock signal to each of clock gating circuits associated with each of the modules;
means for deleting clock pulses from the common clock signal provided to the respective clock gating circuit in dependence on one of the clock frequencies required by the respective module;
means for performing a handshake operation between modules, between which the data is to be transferred; and
means for controlling the handshake operation such that data transfer only occurs in the presence of appropriate patterns of the clock pulses applied to the modules between which the data is to be transferred,
wherein the clock pulses are applied to the modules at times consistent with data sourcing and sinking capabilities of the modules between which the data is to be transferred.

29. An apparatus for clocking a plurality of data processing modules which require different average clock frequencies and for transferring data between the modules comprising:
a clock deletion control unit and a clock gating unit for each of the modules, each clock deletion control unit and each clock gating unit receiving a common clock signal, each clock deletion control unit receiving a clock control signal for the respective module; and
a gate between each clock deletion control unit and each clock gating unit, the gate receiving an output from the clock deletion control unit and a clock force signal from a first module that is ready to transfer data to a second module, the clock force signal causing the output of each gate to be enabled, the clock gating unit receiving the output of the gate and, once the output is enabled, causing the clock gating unit to pass clock signals received from the common clock signal to the respective module,
wherein in the presence of the clock force signal to each gate, the first and the second modules are clocked synchronously while the data is transferred from the first and the second modules.

30. A method for clocking a plurality of data processing modules which require different average clock frequencies and for transferring data between the modules, the method comprising the steps of:
providing a common clock signal to a clock deletion control unit and a clock gating unit for each of the modules;
providing a clock control signal to each clock deletion control unit for the respective module;
providing to a gate between each clock detection control unit and each clock gating unit an output from the clock deletion control unit and a clock force signal from a first module that is ready to transfer data to a second module, the clock force signal causing the output of each gate to be enabled; and
receiving with the clock gating unit the output of the gate and, once the output is enabled, causing the clock gating unit to pass clock signals received from the common clock signal to the respective module,
wherein in the presence of the clock force signal to each gate, the first and the second modules are clocked synchronously while the data is transferred from the first and the second modules.

31. An apparatus for clocking a plurality of data processing modules which require different average clock frequencies and for transferring data between the modules comprising:
a clock gating unit and a clock deletion control unit for each of the modules, each clock gating unit and each clock deletion control unit receiving a common clock signal, each clock deletion control unit receiving a clock control signal for the respective module; and
a first gate arrangement receiving an output of each clock deletion control unit and being responsive to coincident enable signals from each clock deletion control unit to provide each of the enable signals to a second gating arrangement between first and second modules, the second gating arrangement including:
a first gate receiving a valid signal from the first module indicating that it is able to transfer the data, and receiving the enable signals from the first gating arrangement indicating that each clock deletion control unit provides each of the enable signals to the respective clock gating unit to enable clock pulses to pass to the first and the second modules; and
a second gate receiving the enable signals from the second module indicating that the second module is able to receive the data, and receiving the enable signals from the first gating arrangement and providing the enable signals at its output to the first module indicating that the second module is able to receive data,
wherein if the first module produces the valid signal to the first gate and the second module produces the enable signals to the second gate, the valid signal and the enable signals are passed to the first and the second modules respectively when the first gating arrangement provides the enable signals indicating that the respective clock deletion control unit provides the enable signals to the respective clock gating unit.

32. A method for clocking a plurality of data processing modules which require different average clock frequencies and for transferring data between the modules, the method comprising the steps of:

providing a common clock signal to a clock gating unit and a clock deletion control unit for each of the modules;

providing a clock control signal to each clock deletion control unit for the respective module;

receiving with a first gate arrangement an output of each clock deletion control unit;

provide enable signals to a second gating arrangement between first and second modules by having the first gate arrangement responsive to coincident each of the enable signals from each clock deletion control unit;

receiving with a first gate in the second gating arrangement a valid signal from the first module indicating that it is able to transfer the data;

receiving with the first gate in the second gating arrangement the enable signals from the first gating arrangement indicating that each clock deletion control unit provides each of the enable signals to the respective clock gating unit to enable clock pulses to pass to the first and the second modules;

receiving with a second gate in the second gating arrangement the enable signals from the second module indicating that the second module is able to receive the data;

receiving with a second gate in the second gating arrangement the enable signals from the first gating arrangement; and providing the enable signals at an output of the second gate to the first module indicating that the second module is able to receive data, wherein if the first module produces the valid signal to the first gate and the second module produces the enable signals to the second gate, the valid signal and the enable signals are passed to the first and the second modules respectively when the first gating arrangement provides the enable signals indicating that the respective clock deletion control unit provides the enable signals to the respective clock gating unit.

\* \* \* \* \*